Figure 1:
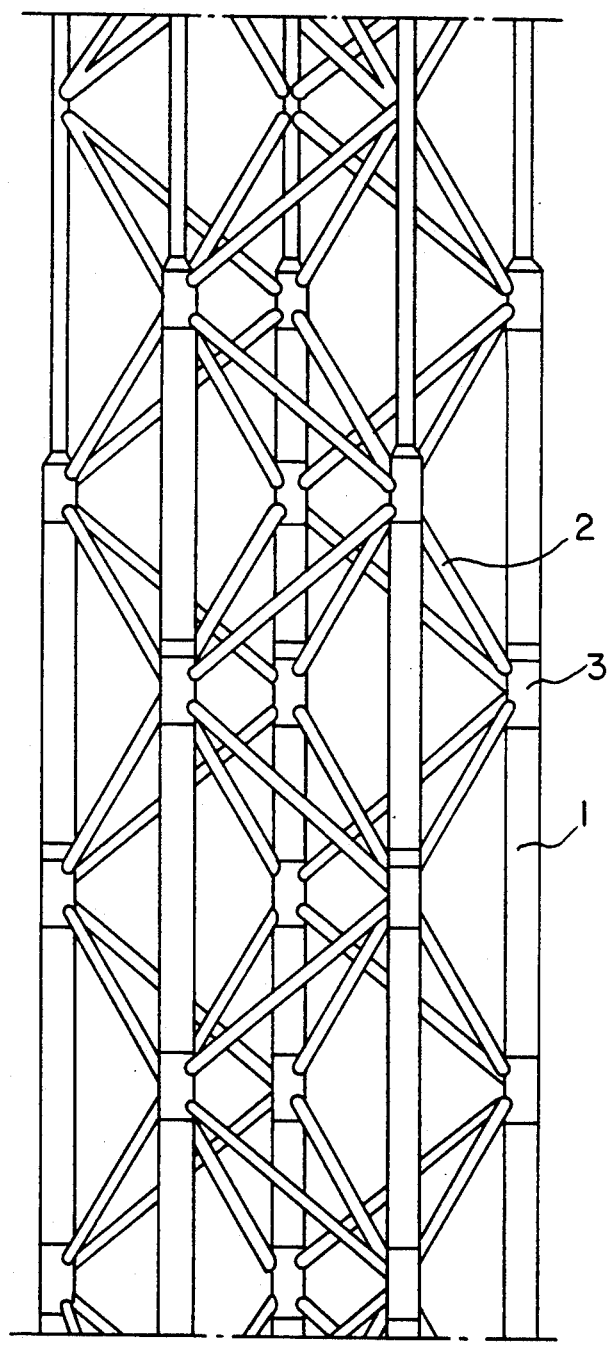

United States Patent [19]

Ferrotti et al.

[11] Patent Number: 5,144,830
[45] Date of Patent: Sep. 8, 1992

[54] METHOD FOR PRODUCTION OF NODES FOR TUBULAR TRUSS STRUCTURES

[75] Inventors: Giannio Ferrotti; Ferruccio Fabbri, Both of Terni, Italy

[73] Assignee: Terni Acciai Speciali S.p.A., Rome, Italy

[21] Appl. No.: 831,668

[22] Filed: Feb. 6, 1992

Related U.S. Application Data

[63] Continuation of Ser. No. 735,153, Jul. 17, 1991, abandoned, which is a continuation of Ser. No. 471,078, Jan. 30, 1990, abandoned, which is a continuation of Ser. No. 208,821, Jun. 17, 1988, abandoned.

[30] Foreign Application Priority Data

Jun. 15, 1987 [IT] Italy .................................. 48056 A/87

[51] Int. Cl.$^5$ ............................................. B21K 21/06
[52] U.S. Cl. ................................. 72/356; 72/368
[58] Field of Search ............... 72/254, 256, 352, 356, 72/358, 368; 29/890.148

[56] References Cited

U.S. PATENT DOCUMENTS

| | | | |
|---|---|---|---|
| 691,454 | 1/1902 | Dies | 29/157 T |
| 4,790,172 | 12/1988 | Simensen et al. | 72/368 |

FOREIGN PATENT DOCUMENTS

| | | | |
|---|---|---|---|
| 28632 | 2/1982 | Japan | 72/352 |
| 215231 | 12/1983 | Japan | 29/157 R |

Primary Examiner—Lowell A. Larson
Attorney, Agent, or Firm—Young and Thompson

[57] ABSTRACT

A method is provided for the production of nodes for tubular truss structures comprised of tubular leg elements connected together by transverse tubular brace elements by means of intermediate joint elements each including a connecting stub element between said leg and brace elements, the improvement wherein said stub element is prepared by the following steps from a steel plate:

(a) bending said steel plate to a U-shape to form a steel piece having a curved portion;
(b) heating said curved portion of said steel piece;
(c) forming a protuberance on said heated portion of said steel piece by cooperative action of said piece with a female die;
adjusting the radius of curvature of the thus-formed piece to correspond to the radius of curvature of the leg element;
(e) forming an aperture on said thus-formed piece along the centerline of said protuberance; and
(f) extruding the thus-formed and pierced piece to the desired final shape of said stub.

1 Claim, 4 Drawing Sheets

5,144,830

METHOD FOR PRODUCTION OF NODES FOR TUBULAR TRUSS STRUCTURES

This application is a continuation of application Ser. No. 07/735,153, filed Jul. 17, 1991, which is a continuation of Ser. No. 471,078, filed Jan. 30, 1990, which is a continuation of Ser. No. 208,821, filed Jun. 17, 1988, all now abandoned.

SUMMARY

According to this invention, in a tubular truss structure, such as, for instance, those used to support offshore platforms for oil and gas prospecting and production, in which long tubular elements, called legs, are connected by transverse tubular elements, called braces, through intermediate elements, called nodes each provided with at least a connecting element, called stub, between leg and brace, each node is prepared by welding at least one curved plate having a stub to at least another curved plate; furthermore, each of said curved plates having a stub is prepared by a method involving the following combination of cooperating stages:

Bending the steel plate to a U-shape

Heating the curved part of the piece thus obtained

Creating a protuberance on said heated part by forming on a female die

Bringing the radius of curvature of the curved and formed plate thus obtained to that of the leg involved Piercing the formed part on centreline of the protuberance Extruding the formed and pierced part to final shape of stub.

DESCRIPTION

This invention refers to a method for the production of nodes in tubular truss structures. More precisely it concerns a method for forming connecting pieces between a leg of a tubular truss structure and the transverse braces which connect it to another leg, for instance in the legs of offshore oil and gas prospecting and production platforms.

Some types of offshore platforms are supported by structures formed by long tubular elements (legs) connected by transverse tubular elements (braces). These structures are continually stressed, not only by the weight of the platform but also by the ocean waves, cyclic loading being of considerable magnitude. Such structures must thus have very considerable tensile, compression, bending and—especially—fatigue strength.

One evident point of stress accumulation is the transition zone between the leg and the transverse brace. Therefore, this must be designed and constructed with great care because of the high loads to which it is subjected throughout the very long life of the platform, during which it is virtually impossible to carry out any maintenance.

The usual structure of platform supporting structures consisting of welded pipes, is not satisfactory for a variety of reasons. One major disadvantage is the fact that the welds between legs and braces are precisely in the transition zone just mentioned, namely where maximum load concentration occurs. This is a factor which must certainly be considered very carefully, especially because in structures of these dimensions it is very difficult to make completely sound welds and to check them.

Other structural models have also been proposed, for instance using relatively small full nodes, or collars each with a brace-carrying stub, or cast nodes, applied to conventional platform configurations. All these, however, suffer from a number of drawbacks.

Where completely tubular structures are concerned, one of the most interesting solutions, proposed in Norwegian Patent Application 84-3792, consists in the use, for the formation of the transition (stub) between leg and brace, of a steel plate, curved to suit the radius of the leg, pierced where the joint has to be made and then extruded at the hole to form the stub. This plate is assembled and welded with other appropriately-shaped plates to form the node.

Though this solution is interesting from the theoretical point of view, it is actually beset by several quite major drawbacks. For instance, in order to push the joint with the brace at the maximum possible distance from the leg, considerable deformation must be exerted by extrusion; however, this causes excessive thinning of the stub walls; to keep this thinning within acceptable limits and particularly to ensure there are no major thickness discontinuities in the transition with the brace, it is necessary to start from very much thicker plate than would otherwise be required. On the other hand, if it is wished to adopt plate thicknesses close to those utilized for the leg, because of the hole that is needed for the extrusion, only stubs of very limited length can be produced, thus reducing the advantage of shifting the weld with the brace a reasonable distance away from the surface of the leg.

It is evident therefore that the interest in this solution is decidedly limited because of such unfavourable factors as excessive increase in weight compared with the known tubular node possible variations in thickness along the leg, and shortness of the distance between weld and leg.

In short, even today there is still no really reliable node-construction technology for large tubular truss structures such as those used to support off-shore platforms.

Object of the present invention is to overcome these difficulties by providing a new way of making the nodes on large tubular truss structures; the invention permits the production of nodes with any number of stubs which adequately distance the brace welds from the surface of the leg, thus ensuring that cautious safety limits are observed, such braces being set at any desired angle to the leg.

According to this invention, in a tubular truss structure built of long tubular elements, called legs, interconnected by transverse elements, called braces, through intermediate elements, called nodes, each having at least one connecting element, called stub, between leg and brace, the stub is prepared starting from a steel plate, according to a method characterized by the following sequence of operations, namely Bending the steel plate to a U-shape Heating the curved part of the piece thus obtained Creating a protuberance on said heated part by forming on a female die Bringing the radius of curvature of the curved and formed piece thus obtained to that of the leg Piercing the formed part on centreline of the protuberance Extruding the formed and pierced part to final shape of stub.

By assembling at least one of the pieces thus obtained with at least one curved plate, a node is formed for mounting on a leg.

The curved part of the piece obtained by U-bending the plate is heated to a temperature between 950° and 1200° C., so as to permit rapid hot forming of the piece in the following stage, preferably in a single operation.

Deformation of a part of the heated zone of the U-bent piece on a female die is designed to produce a protuberance on the convex face of the U-piece, said protuberance having a diameter close to that of the final stub, a reasonable length and a centreline orientated at the angle at which the brace must be connected to the leg.

The deformation can be achieved by forming the heated, U-bent piece in a similarly curved female die having a recess whose shape and angle are those of the desired protuberance. Final extrusion of the protuberance to form a stub of the specific length and wall thickness is performed by at least one pass, the extrusion punch preferably having a conical profile and the lower die essentially having the final configuration of the desired stub. The most interesting advantage of this working method consists in forming a first adequately-long initial protrusion, whose diameter is approximately that of the final stub, before the piercing necessary for the extrusion. Thus, in fact, the first deformation, which creates the largest part of the stub, occurs when the plate is still unpierced; the whole volume of the deformed part thus contributes to the formation of the stub, so the process starts from plate whose original thickness is far less than that needed in the processes starting from pierced plate.

Furthermore, as the stub is obtained by extrusion of a part already deformed in the desired direction and at the required angle, its length can be increased, the brace weld being moved even farther away from the zone affected by the maximum stress build-up.

It will be evident from the foregoing that by operating according to the present invention it is possible to obtain stubbed plates much lighter and with longer stub than otherwise possible by known methods. In fact, from scale tests performed, considering in every case node parts whose area is equal to that of a plate according to this invention, the following results were obtained:

|  | Node from tube | Node from plate (known technique) | Node from plate (present invention) |
| --- | --- | --- | --- |
| Wall thickness, mm | 16 | 30 | 20 |
| Thickness at end of stub, mm | 10 | 20 | 10 |
| Distance on stub centerline between node surface and end of stub, mm | 0 | 81 | 215 |
| Weight (plate + stub), kg | 70 | 226 | 182 |

As can be seen, with the present invention it is possible to operate with reasonably thin original plate, and yet obtain a good stub length. According to the known techniques, instead, starting from relatively thin plates, short stubs are obtained whose length does not increase in proportion with increase in plate thickness.

As already mentioned, it is very important to be able to distance the brace weld from the surface of the node because the build-up of stresses in the various parts of the node is greatest at the surface, in the transition zone with the brace, and decreases moving away from that zone.

In this regard it can be estimated that in some situations (leg diameter 500 mm, brace diameter 250 mm) at 100 mm from that transition zone the forces may range from one third to one half the maximum, while at 200 mm the value is reduced to between one eighth and one sixth of the maximum. It is evident therefore that by lengthening the stub the welding can be carried out a safe distance from the zone of maximum stress build-up, so thinner plate can be used, thus lightening the final structure and decreasing costs.

A further advantage of this invention compared with the known plate technique is that the end part of the stub has a circular profile which permits the use of simple automatic welding techniques. With the known techniques, instead, the profile of the end part of the stub is elliptical, so welding difficulties are considerably increased, the job frequently having to be done by hand. The node as per this invention can be sent directly to the site for assembly on the leg and connection to the braces; in the case of the known technique, instead, it is preferable to weld to the stub an extension with a circular section, free end so as to avoid having to perform difficult welding of an elliptical shape during erection.

The many and important advantages of the present invention are already apparent from what is said hereinbefore. However, the invention will now be explained in greater detail by reference to a number of drawings given purely by way of example and in no way limiting the scope of the invention, namely:

FIG. 1 Elevation of a part of the truss structure

Figure 2:
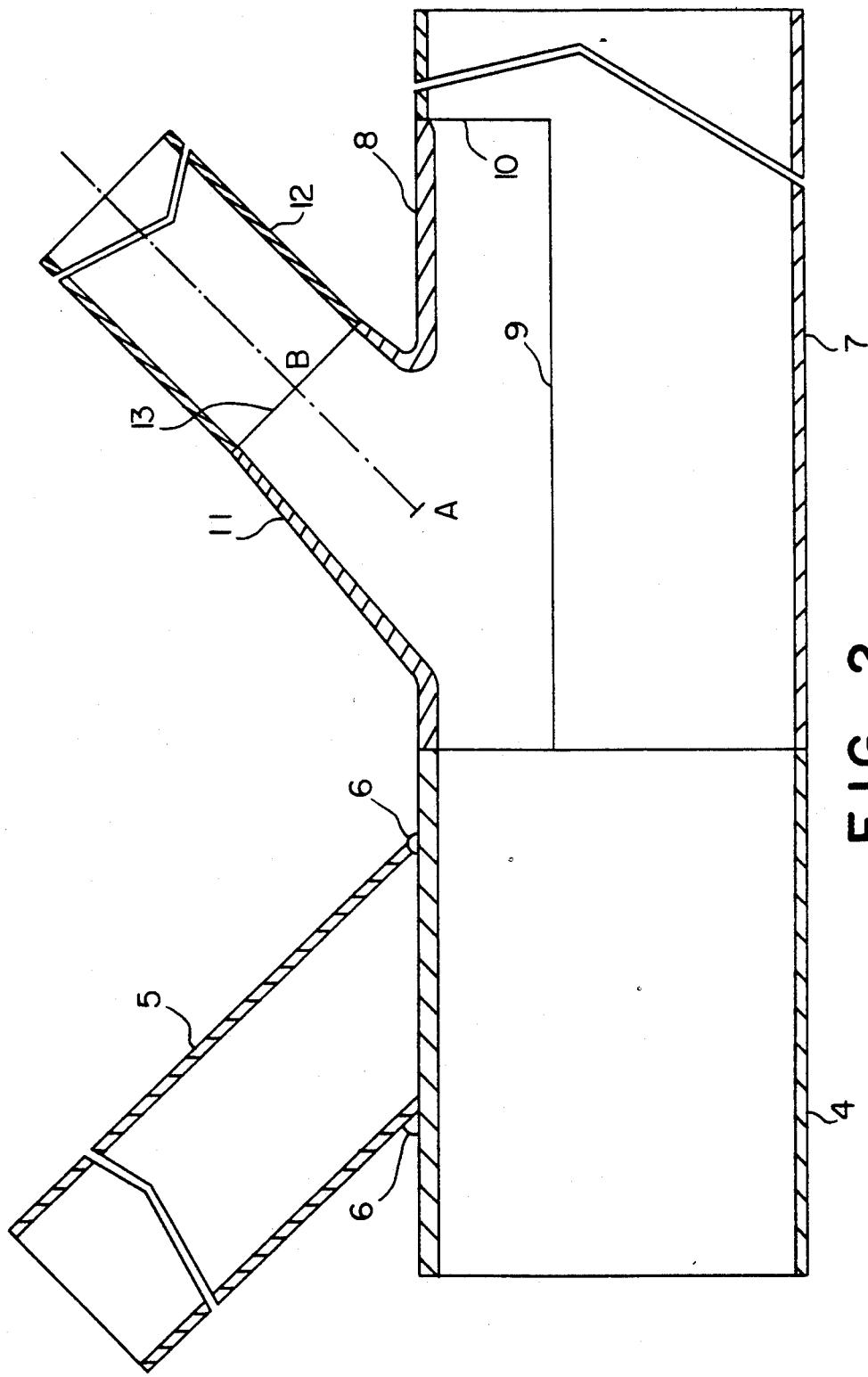

FIG. 2 Transverse section of a type of node

Figure 3B:
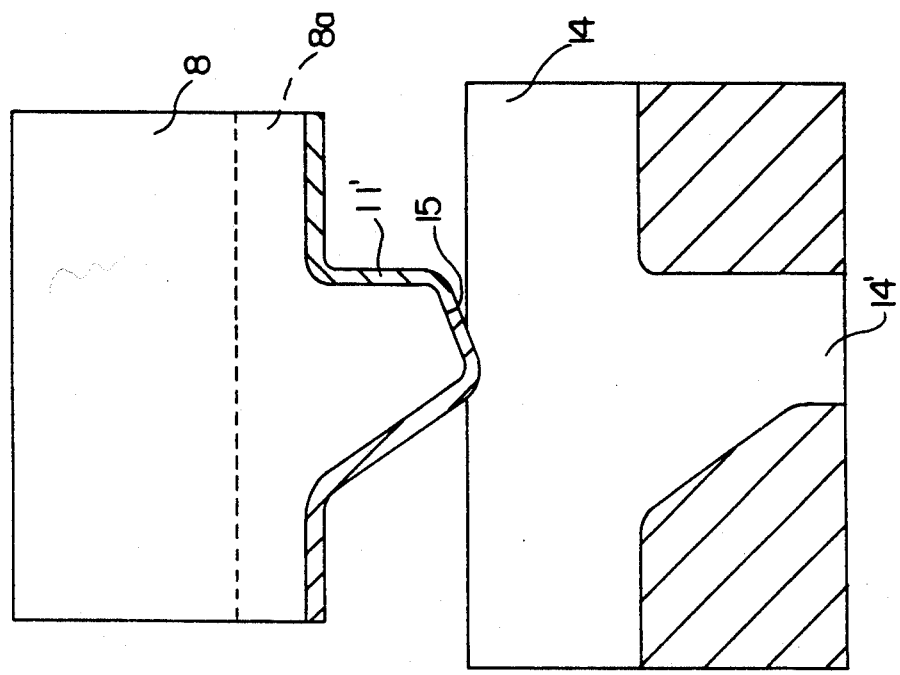
Figure 3A:
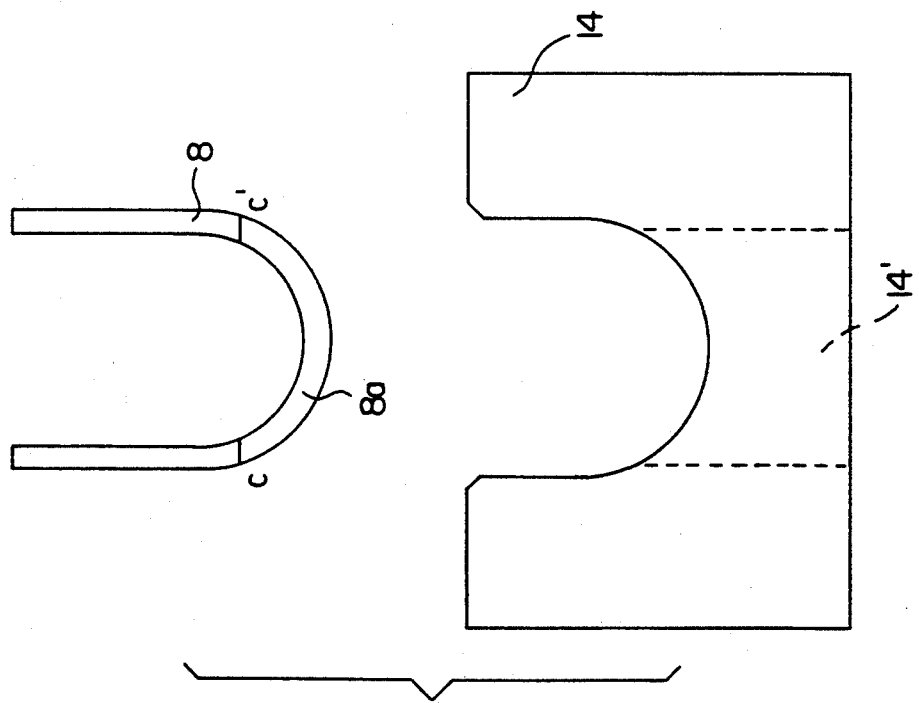
Figure 4:
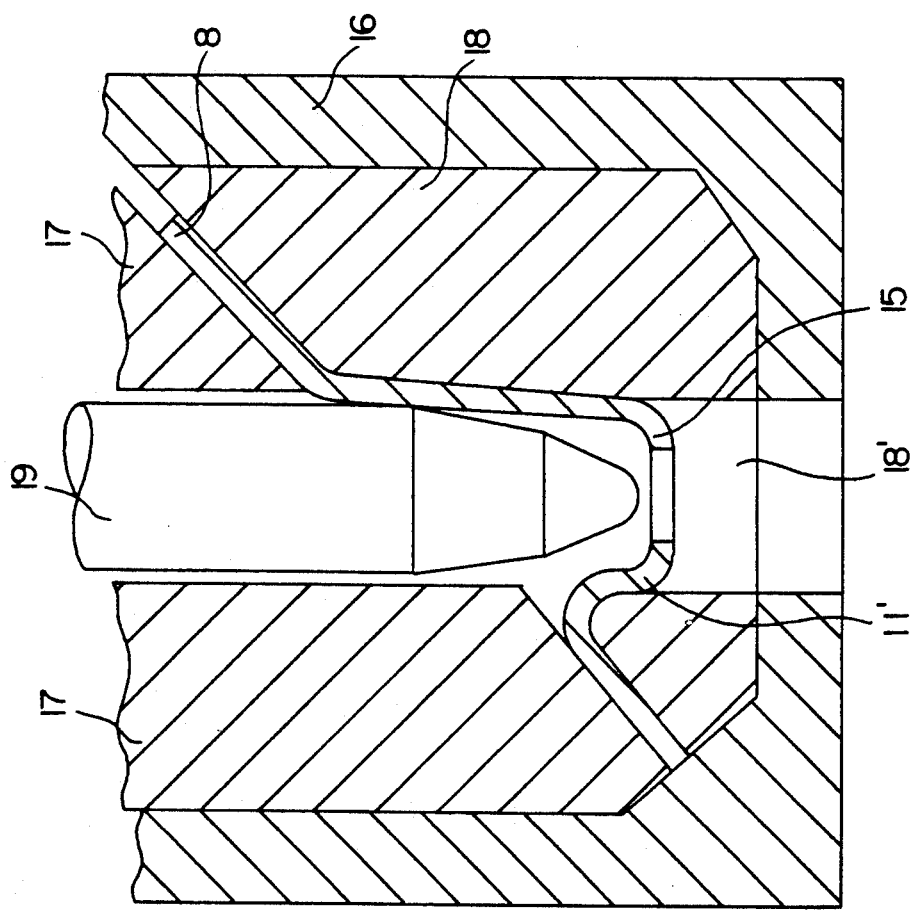

FIGS. 3a and 3b Elevation and longitudinal section of an assembly of U-bent plate and female die in two successive phases of working FIG. 4 Partial sectional view of a plate assembly with stub for extrusion, extrusion die and extrusion punch.

With reference to FIG. 1, representing a part of a tubular truss structure which forms, for example, the structure supporting an offshore platform, 1 indicates a leg, 2 a brace and 3 a node. The complexity of the structure in general and of the nodes in particular is quite evident, as is the great number of nodes necessary, and consequently the role these play in the stability, security and final cost of a platform.

FIG. 2 illustrates a longitudinal section of a so called K-node. The left half of the Figure provides an example of the general problems of nodes, while the right-hand part refers to the present invention.

In the classical node configuration—left-hand part of FIG. 2—the main body of the node consists of a large-diameter tube 4 to which is welded a smaller tube 5 which is the brace. Junction 6 where the brace joins the large tube is very clearly the weak point in the structure and, unfortunately it is located precisely in the zone where there is the maximum accumulation of stresses.

According to the invention, instead—right—hand part of FIG. 2—a plate of appropriate thickness 8, which has been formed with a stub 11, is welded along lines 9 and 10 to the rest of the node 7 which, in turn, can be formed of one or more parts.

Brace 12 is welded to stub 11 along line 13 which is circular in form. The length of the stub is measured along its centreline between points A and B which represent respectively the intersection of the stub centreline with the surface of the joint and the centre of the circle formed by the free end of the stub, here indicated by line 13.

Turning now to the methods of producing the extruded parts according to this invention, FIG. 3 illustrates two successive situations, represented by FIG. 3a and FIG. 3b. The former shows a transverse elevation of plate 8 bent to a U-shape, and die 14. The curved part 8a of U-shaped plate 8, for instance beneath the broken line C—C' is heated to a high temperature, typically between 950° and 1200° C. and is then placed in die 14 having an appropriate recess 14', marked by broken lines, and is then deformed using known methods. The product of this deformation is shown in the upper part of FIG. 3b, this time in longitudinal section. The heated part 8a of plate 8 has been forced to deform within the recess 14', so as to form the protuberance 11'.

In the subsequent phases, the end part 15 of the protuberance 11' is pierced on the centreline thereof and again brought to a high temperature, e.g. between 950° and 1200° C. The piece is then placed in an extrusion die 16 (FIG. 4), where it is held in position, vis-à-vis form 18, which has an appropriate conical recess 18', by element 17. A conical punch then forms the end part 15 of the protuberance 11', thus creating stub 11, with walls of variable thickness, as shown in FIG. 2. As can be readily observed, this invention exploits a highly original combination of bending and welding and forging operations which enable high-precision forgings to be obtained rapidly and without costly modification of standard equipment and procedures.

Attention should also be drawn to a factor that is essential for the safety of the final product, namely the combination of lightness of the piece with its specific shape. This combination permits a zone of possible weakness—i.e. that where the brace is welded—to be moved a considerable distance from the zone of maximum stress build-up.

It should be recalled that various factors which must be considered in the design of trestle structures for offshore platforms require the length of the stub to be at least three-quarters the radius of said stub: according to this invention, the length of the protuberance obtained during the first deformation of the heated part of the U-bent plate is at least half the radius of the stub, while in the final piece it is very easy to exceed the minimum desired length by a considerable margin. It can be seen from the table given earlier that the node made from welded tube is the lightest of all; in practice, however, owing to the very unfavourable position of the weld, the thicknesses of the various parts have to be increased, so the weight of the final node is also increased. Therefore, in practice, the usual tube-welded node is only apparently lighter than that according to this invention and it is potentially less safe. The other plate nodes made with the known technique described earlier, are also much heavier than the nodes made according to the invention and moreover they are less safe.

The weight factor is of great importance, too, from the safety point of view. The structure of the platform trestle is, in fact, constantly being stressed by waves, some of considerable height. A decrease in the total weight of the nodes not only decreases the static load of the trestle components but reduces the dynamic load to an even greater extent.

To conclude, this invention ensures great advantages as regards platform safety, simpler node-preparation, weight reduction and cost saving.

What is claimed is:

1. Method for the production of nodes for tubular truss structures comprised of tubular leg elements connected together by transverse tubular brace elements forming acute angles with said leg elements by means of intermediate joint elements each including at least a connecting stub element between said leg and brace elements, wherein said stub element is prepared by the following steps:
   a) bending an imperforate steel plate to a U shape to form a steel piece having a curved portion;
   b) subsequently heating to high temperature, from about 950° C. to about 1200° C., said curved portion of said steel piece;
   c) forming an imperforate protuberance having an acutely angled centerline on said heated portion of said steel piece by extruding said piece into a female die having an acutely angled recess therein;
   d) adjusting the radius of curvature of the thusformed piece to correspond to the radius of curvature of the leg elements;
   e) forming an aperture on said thus-formed piece on the acutely angled centerline of said protuberance;
   f) subsequently heating to high temperature, from about 950° C. to about 1200° C., said protuberance of said thus-formed piece at its terminal portion; and
   g) extruding the thus-formed and pierced and heated protuberance with a male die extending and moving in the direction of said acutely angled centerline, to the desired final shape of said stub element, thereby to produce on said stub a circular end edge disposed in a plane perpendicular to said acutely angled centerline.

* * * * *